June 1, 1926.
D. MILNER
1,587,398
SPRING WHEEL
Filed Feb. 6, 1926
2 Sheets-Sheet 1
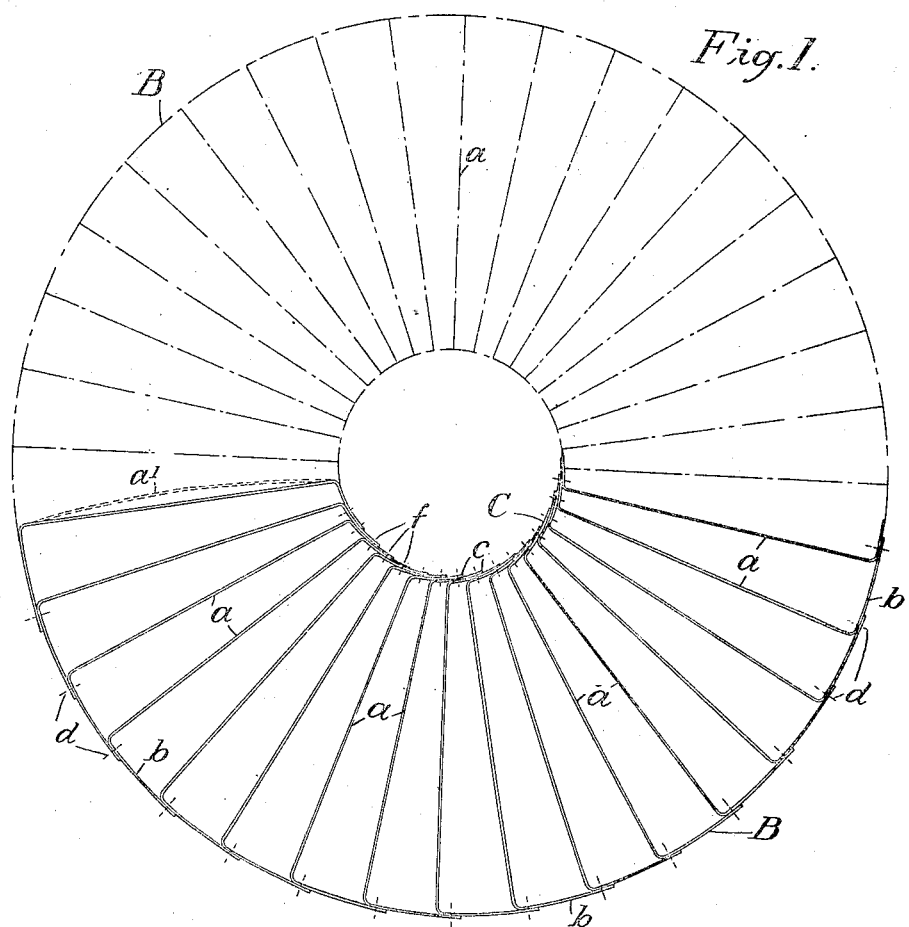
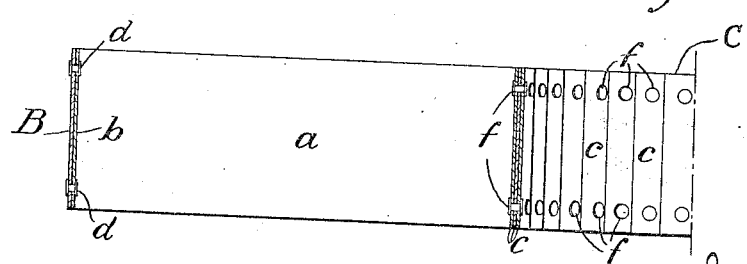
Inventor:-
Dennis Milner
By Smith and Michael,
Attorneys.

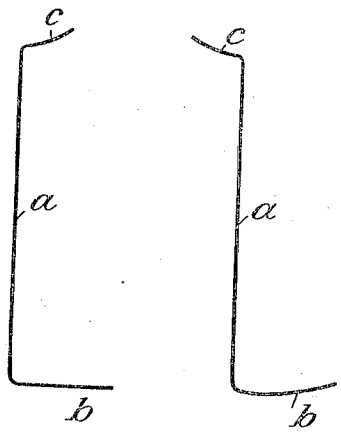
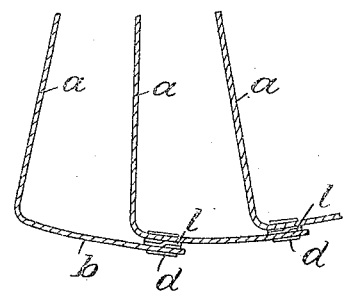
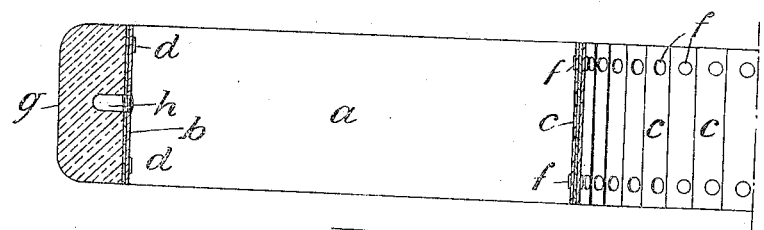
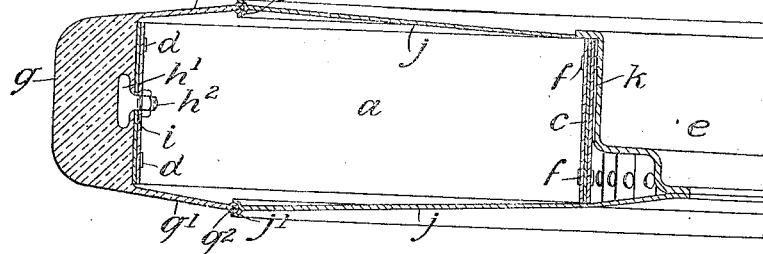
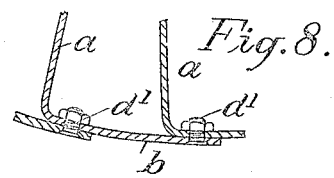

Patented June 1, 1926.

1,587,398

UNITED STATES PATENT OFFICE.

DENNIS MILNER, OF LONDON, ENGLAND.

SPRING WHEEL.

Application filed February 6, 1926, Serial No. 86,643, and in Great Britain September 3, 1924.

This invention relates to spring wheels or resilient wheels for vehicles, and has for its main object to provide an improved wheel of simple construction, in which the customary rigid spokes and rim are replaced by spring members, the yielding movement taking place substantially radially of the wheel. The invention has also for its object the provision of a wheel which is capable of being built up from a plurality of identical components, which are adapted for production by stamping from sheet metal and for assembly by simple means such as by riveting. A further object of the invention is to provide a spring wheel which can be mounted upon a permanent hub or upon an extension thereof, as in the case of the detachable wheels in current use.

The invention is hereafter described with reference to the accompanying drawings, in which:—

Figure 1 is a side elevation of one form of my improved spring wheel. Figure 2 is an enlarged radial sectional view at right angles to Figure 1. Figure 3 is a view showing in outline one of the spring members and limbs integral therewith. Figure 4 is a similar view showing another arrangement. Figure 5 is a fragmental longitudinal sectional view showing spring washers between the connected outer limbs of adjacent spring members. Figure 6 is a view similar to Figure 2, showing a tire or wearing piece secured upon the resilient outer felly. Figure 7 is a view similar to Fig. 6 but showing also protecting side discs welded or otherwise secured to a hub, on which the inner rigid rim or hub shell is mounted. Figure 8 is a view similar to Fig. 5 illustrating the use of a screw bolt for connecting the limbs of adjacent spring members.

The spring members $a$ constituting the spokes of the wheel, are made of suitable metal, for example sheet steel, so as to form blade springs, and are straight throughout their length. At their ends they are provided with cranked limbs $b$ and $c$ set angularly to the straight length $a$; the limbs $b$ and $c$ are preferably integral with the straight portions $a$.

The members $a$ are arranged in substantially radial planes perpendicular to the plane of the wheel and so that when deflected or bowed as indicated in dotted lines at $a^1$ in Figure 1 the movement takes place in the plane of the wheel.

The outer limbs $b$ are connected together in series, to form an elastic outer rim or felly made up in contiguous sections and indicated in Figures 1 and 2 as B. The free extremity of each limb $b$ is secured, as by one or more rivets $d$, with interposed spring washers $l$ if desired (see Figure 5) to the heel of the adjacent limb $b$ of the next member $a$ immediately beyond the spoke or straight portion $a$. Instead of rivets $d$, bolts $d^1$ may be employed, as shown in Figure 8; or the parts may be connected by welding. Thus the felly B is composed of a series of limbs $b$ connected together to form an endless felly.

The inner limbs $c$ are connected together to form a rigid inner rim indicated in Figures 1 and 2 as C; this rim C is adapted to be mounted upon a separate hub $e$. The inner limbs $c$ are overlapped so that each limb $c$ is juxtaposed against two other limbs $c$, the several limbs $c$ being thus superposed for a portion of their length to make up a comparatively thick and therefore rigid inner rim or hub shell when the parts are secured together. In Figures 6 and 7 the limbs $c$ are secured together by rivets $f$, to form the rigid inner rim; instead of rivets $f$, bolts as in Figure 8 or welding may obviously be employed.

In Figures 1 and 3, the component $a\ b\ c$ is shown of approximately a rectangular C shape, the angular limbs $b$ and $c$ being both to the same side of the rectilinear portion $a$. In Figure 4, the component is shown of approximately Z shape, the angular limbs $b$ and $c$ being on opposite sides of the rectilinear portion $a$. Either construction may be employed but I prefer the arrangement of the angular limbs $b$ and $c$, shown in Figure 3.

The straight blade springs or spokes $a$ having their outer limbs $b$ linked together tandem to form a sectionally constructed outer resilient felly, and their inner limbs $c$ rigidly secured together to form a rigid inner rim, are adapted to yield to end-on pressure upon the rectilinear spokes, with the result that this improved wheel is resilient to a degree not practically attainable with other forms of spring wheels; the principal loading taken by the blade spring or spoke members is an endways compression along their length, it being my intention to use as much as possible the special property of blade springs so disposed that when compressed they yield suddenly under the load, as distinguished from most springs which tend to deflect more or less uniformly in proportion to the load. The straight spokes *a* are preferably arranged radially of the wheel but they may have a small inclination to the radius for resisting torsional effects.

The resilient outer felly B may be employed to bear direct on the road or other surface on which the wheel is used, or it may be fitted with an outer wearing piece or tire *g*, of metal, rubber, or other material as shown for example in Figures 6 and 7. This rubber tire *g* is secured in any suitable manner to the felly; as examples I have shown in Figure 6 a peg *h* riveted to the felly B and passing into the body of tire *g*. In Figure 7 I show a T-headed inset $h^1$ sunk in the rubber *g* and provided with an inwardly projecting bolt $h^2$ passing through a perforation or slot *i* in the elastic felly B. This slot or perforation *i* is preferably set between two rivets *d d* as seen in Figure 7. Any desired number of these pegs *h* or bolts $h^2$ may be used, spaced around the felly B.

If desired, the sides of the improved spring wheel may be wholly or partly closed in by means of annular discs or flanges *j* shown in Figure 7 as extending outwardly from the hub *e*, to which they are welded or otherwise secured. These discs *j* tend to exclude mud, moisture and the like in the known manner, without impeding the yielding action of the rectilinear, spring-blade spokes *a*. The tire *g* is also shown in Figure 7 with side walls $g^1$ provided with inextensibly cored or wired edges $g^2$ seated in the grooved peripheries $j^1$ of the flanges *j*.

When the inner rigid rim C is mounted upon a detachable hub *e* as shown in Figure 7, the inner periphery of the rigid rim C is shaped to fit the outer periphery of the hub *e* which may be notched, or recessed as at *k* to fit the overlapping limbs *c* and rivets *f*.

It is to be noted that the series of rectilinear blade spring members *a* are provided with outer and inner limbs *b* and *c* which form the outer resilient felly B and the inner rigid rim C, without the employment of hinges or pivotal connections. In Figure 5, I have however shown a spring washer *l* between the adjacent outer limbs *b*, said washer *l* being mounted on the rivet *d* to take up any play which may develop in use, but there is in this improved spring wheel with straight blade spokes, no hinged or pivotal connection between the parts. The lateral deflection or bowing of the spring blade member *a* due to endways compression, and the yielding nature of the outer resilient felly B enable me to dispense with all such hinges or pivots as heretofore employed, so that the benefit of springs of the full length of the straight members *a* is obtained.

What I claim is:—

1. A spring wheel comprising a series of rectilinear, spring-metal, spoke-forming blades, said blades being set across the plane of the wheel, and deflectible for substantially the whole of their length in the plane of the wheel, limbs secured to said blades at their inner and outer ends and angularly thereto, the limbs at the outer ends being coupled together to form a resilient outer felly with the end of one limb riveted to the beginning of the adjacent limb, and the limbs at the inner ends of the blades being superposed and riveted together to form a rigid inner rim adapted to be mounted on a vehicle hub, means for operatively securing a tire upon said elastic felly, and annular disc members mounted on the vehicle hub and arranged to shield the edges of said spoke-forming blades, grooved peripheries to said disc members, and side-flaps upon said tire, said side-flaps seated in the grooved peripheries of said disc members.

2. A spring wheel comprising a series of straight spring-metal blade members, limbs integral with said members and set angularly thereto at the inner and outer ends of the member, said outer limbs being riveted together in series to form a resilient outer felly made in sections, a spring-washer interposed between the abutting faces of the said outer limbs, said inner limbs overlapping and being juxtaposed each against two other inner limbs and being rigidly secured together to form a rigid inner rim adapted to be mounted on a vehicle hub, and said straight blade members being arranged radially between the said outer felly and said rigid rim and supporting the vertical load at ground contact by compression endwise of their length.

In testimony whereof I hereunto affix my signature.

DENNIS MILNER.